United States Patent
Michel

(10) Patent No.: US 6,368,468 B1
(45) Date of Patent: Apr. 9, 2002

(54) ZIRCONIA BASED ARTICLE, USE OF SUCH AN ARTICLE AS A WEAR RESISTANT EXTERIOR PART FOR A WRISTWATCH AND METHOD FOR OBTAINING SUCH AN ARTICLE

(75) Inventor: Béatrice Michel, Brügg (CH)

(73) Assignee: Asulab S.A., Bienne (CH)

( * ) Notice: Subject to any disclaimer, the term of this patent is extended or adjusted under 35 U.S.C. 154(b) by 0 days.

(21) Appl. No.: 09/885,916

(22) Filed: Jun. 22, 2001

Related U.S. Application Data

(62) Division of application No. 09/264,571, filed on Mar. 8, 1999, now Pat. No. 6,270,907.

(30) Foreign Application Priority Data

Mar. 10, 1998 (CH) ................................................ 0569/98

(51) Int. Cl.⁷ ................................................. H05F 3/00
(52) U.S. Cl. ........................ 204/164; 204/177; 264/647; 264/676
(58) Field of Search ................................ 204/164, 177; 264/647, 676; 501/102, 103

(56) References Cited

U.S. PATENT DOCUMENTS

| | | | |
|---|---|---|---|
| 4,639,426 A | * | 1/1987 | Nagato et al. |
| 4,640,869 A | * | 2/1987 | Loth |
| 5,290,332 A | * | 3/1994 | Chatterjee et al. |
| 5,358,913 A | * | 10/1994 | Chatterjee et al. |
| 5,672,302 A | | 9/1997 | Chatterjee et al. |
| 5,679,611 A | * | 10/1997 | Chatterjee et al. |

FOREIGN PATENT DOCUMENTS

EP 0 850 900 A1 7/1998

OTHER PUBLICATIONS

Patent Abstracts of Japan, vol. 096, No. 002, Feb. 29, 1996 & JP 07–277860 A (Sekisui Plastics Co. Ltd.) Oct. 24, 1995.
DATABASE WPI, Section Ch, Week 8815, Derwent Publication Ltd., London, GB; Class L02, AN 88–101233, XP002072875 & JP 63–050383 A (Hitachi Metals Ltd.) No Month.
Patent Abstracts of Japan, vol. 014, No. 431 (C–0759), Sep. 17, 1990 & JP 02–167875 A (Toray Ind. Inc.), Jun. 28, 1990.
DATABASE WPI, Section Ch, Week 8230, Derwent Publication Ltd., London, GB; Class M13, AN 82–62489E, XP002031842 & JP 57–098671 A (Suwa Seikosha KK) No Month.

* cited by examiner

Primary Examiner—Deborah Jones
Assistant Examiner—Jason Savage
(74) Attorney, Agent, or Firm—Griffin & Szipl, P.C.

(57) ABSTRACT

A zirconia based article having a core of $ZrO_2$ and/or partially reduced $ZrO_2$, is characterized in that it includes, over at least part of its surface, a superficial layer integral with the article, the thickness of the superficial layer including a plurality of regions of which one external region is formed of zirconium nitride having a gold metallic appearance.

2 Claims, 2 Drawing Sheets

ZIRCONIA BASED ARTICLE, USE OF SUCH AN ARTICLE AS A WEAR RESISTANT EXTERIOR PART FOR A WRISTWATCH AND METHOD FOR OBTAINING SUCH AN ARTICLE

This is a division of U.S. patent application Ser. No. 09/264,571, filed Mar. 8, 1999, now U.S. Pat. No. 6,270,907 the entire disclosure of which is considered a part of this application and is hereby incorporated by reference.

FIELD OF THE INVENTION

The present invention concerns a zirconia based article, particularly a sintered article, and in particular an article of this type whose chemical structure is transformed over part of its thickness to give it an external surface having a gold-plated metal appearance. The invention also concerns a use of such an article, as an exterior part for a wristwatch, in particular for making construction parts for watch cases or wristbands. The present invention concerns, finally, a method for obtaining such an article.

BACKGROUND OF THE INVENTION

Among all known materials, metals are very widely used because of certain advantageous properties: a high level of mechanical resistance, a high level of toughness, electrical conductivity, etc. Moreover, the characteristic brilliance or lustre of such metals is very much sought after for decorative applications such as for making watch cases or such. The hardness of solid gold or gold coloured coatings is however inferior to that of ceramics, which may result in significant wear in numerous common conditions of use, for example when these materials are used to make exterior parts used in watchmaking, such as watch cases or wristbands.

In order to overcome these drawbacks, it has long been sought to increase the hardness of articles made of solid gold or including a gold coloured coating. However, conventional metallurgic methods do not allow very high levels of hardness to be attained, i.e., levels of hardness greater than 1,000 HV (Vickers hardness), which would allow scratchproof decorative parts having a gold-plated metal appearance to be made.

This is why one has proposed increasing the hardness of metals by adding very hard particles. Two-phase composites have thus been made formed of a metallic phase coating hard particles, which frequently take up most of the volume of the material. A certain number of materials of this type having a gold-plated metal appearance have been developed and are today commonly used in industry. They are generally called "cermet" when they are made of a ceramic material, for example titanium nitride.

All these materials have in common however the fact that they include a distinct metallic phase which may limit their resistance to corrosion and their mechanical properties at high temperatures.

Moreover, the metallic phase used as binding agent always contains nickel or cobalt, all attempts to substitute other metals for these elements having failed until now. However, the use of nickel and cobalt, in applications which result in prolonged contact with the skin, such as, for example, for watchmaking and jewelry applications, must be avoided since these elements are known to frequently cause allergies.

Finally, these materials are generally difficult to shape. This constitutes a significant limitation for the manufacture of exterior parts for watchmaking or pieces of jewelry which often have complex shapes with resultant high manufacturing costs.

SUMMARY OF THE INVENTION

An object of the invention is thus to overcome the drawbacks of the prior art by providing a zirconia based article, in particular a sintered article, having all the advantageous properties of conventional ceramic parts (hardness, shapeability, lack of allergenic effect, etc.) while having the brilliance or lustre of gold-plated metal parts.

Another object of the invention is to use in an advantageous manner certain properties of the zirconium carbide obtained by converting the zirconia at the surface of a part for aesthetic and decorative purposes within the scope of applications in the watchmaking industry.

Another object of the present invention is to provide a method for obtaining such a zirconia article which may easily be industrialized and which allows these articles to be obtained at cycle rates and costs compatible with market requirements.

The invention thus concerns a zirconia based article having a $ZrO_2$ and/or partially reduced $ZrO_2$ core characterized in that it includes, over at least part of its surface, a superficial layer integral with said article, said superficial layer including a plurality of regions of which one external region is formed of zirconium nitride having a gold, metallic brilliance.

According to a preferred feature of the article according to the invention, the superficial layer includes a transition region situated between the core and the external region, said transition region including sub-stoichiometric zirconium nitride and zirconium oxynitrides.

It is to be noted that the chemical composition of the superficial layer varies as a function of the depth measured from the surface of the exterior part and passes continuously, i.e., without interruption of continuity, from stoichiometric zirconium nitride (ZrN) to a transition region including sub-stoichiometric zirconium nitride and zirconium oxynitrides.

According to another preferred feature of the invention, the nitrogen content of the sub-stoichiometric zirconium nitride in the transition region decreases with the depth while the oxygen content of the oxynitrides increases with the depth.

The transition region thus includes sub-stoichiometric zirconium nitride whose nitrogen content gradually decreases as one progresses towards the core of the article whereas its oxygen content progressively increases in the form of zirconium oxynitride ($ZrO_xN_y$) type compounds, to progressively reach the core of the article which is essentially formed of partially reduced zirconia of the $ZrO_{2-x}$ type and/or zirconia ($ZrO_2$). It will of course be understood that the transition between these various regions happens gradually, the quantity of a compound of an upper region decreasing in favour of a compound of a lower layer.

Chemical analysis of the superficial layer by RBS-ERDA measuring techniques has demonstrated the relative concentrations of zirconium, nitrogen and oxygen corresponding to the aforecited chemical compounds as a function of the depth from the surface of the article.

The invention also concerns a method for obtaining a finished or semi-finished zirconia article having a $ZrO_2$ and/or partially reduced $ZrO_2$ core, having a gold-plated metallic external appearance, characterized in that it includes the steps of:

providing at least one zirconia article previously shaped into its finished or semi-finished shape;

placing said article in a reaction vessel in which a plasma obtained from a gaseous mixture of ammonia and an inert gas, a mixture of nitrogen, hydrogen and an inert gas or a combination of such two mixtures is generated; and maintaining said article in the plasma for a period of time of approximately 15 to 240 minutes, the average temperature of the article being in these conditions between approximately 600 and 1,300° C.

In order to make such articles, one started by making, in accordance with conventional techniques, a conventional zirconia ceramic part having all the required properties, but with no metallic features. This part was then subjected to the method according to the invention in order to transform the crystallographic structure of its surface thereby forming a superficial layer including, in particular, an external region formed of zirconium nitride.

The external region of the superficial layer of the zirconia exterior part transformed according to the method of the invention thus gives such part the optical characteristics of a zirconium nitride of gold metallic appearance.

Moreover, grazing X ray diffraction analysis has shown that the structure of the superficial layer transformed at the surface has the crystallographic structure corresponding to that of zirconium nitride.

Standard X ray diffraction analysis has shown that the crystallographic structure of the core of the part corresponds to that of tetragonal zirconia.

The articles obtained from this method acquire certain new properties, in particular electrical conductivity and a gold metallic brilliance or lustre while keeping the properties of ceramics, in particular their very high level of hardness.

Quite unlike known "hard metals" and "cermets", the zirconia articles according to the invention do not contain any metallic phase containing Ni or Co.

The invention also concerns the use of a ceramic material having a $ZrO_2$ and/or partially reduced $ZrO_2$ core as a wear resistant exterior part for a wristwatch, such part including, over at least part of its surface, a superficial layer integral with said part, the thickness of said superficial layer including a plurality of regions of which one external region is formed of zirconium nitride having a gold metallic brilliance.

Other features and advantages of the invention will be better understood hereinafter with the aid of the following description of an embodiment example of a zirconia article having a gold metallic external appearance, such description being given solely by way of illustrative example and made with reference to the annexed drawings.

DETAILED DESCRIPTION OF THE INVENTION

Figure 1:
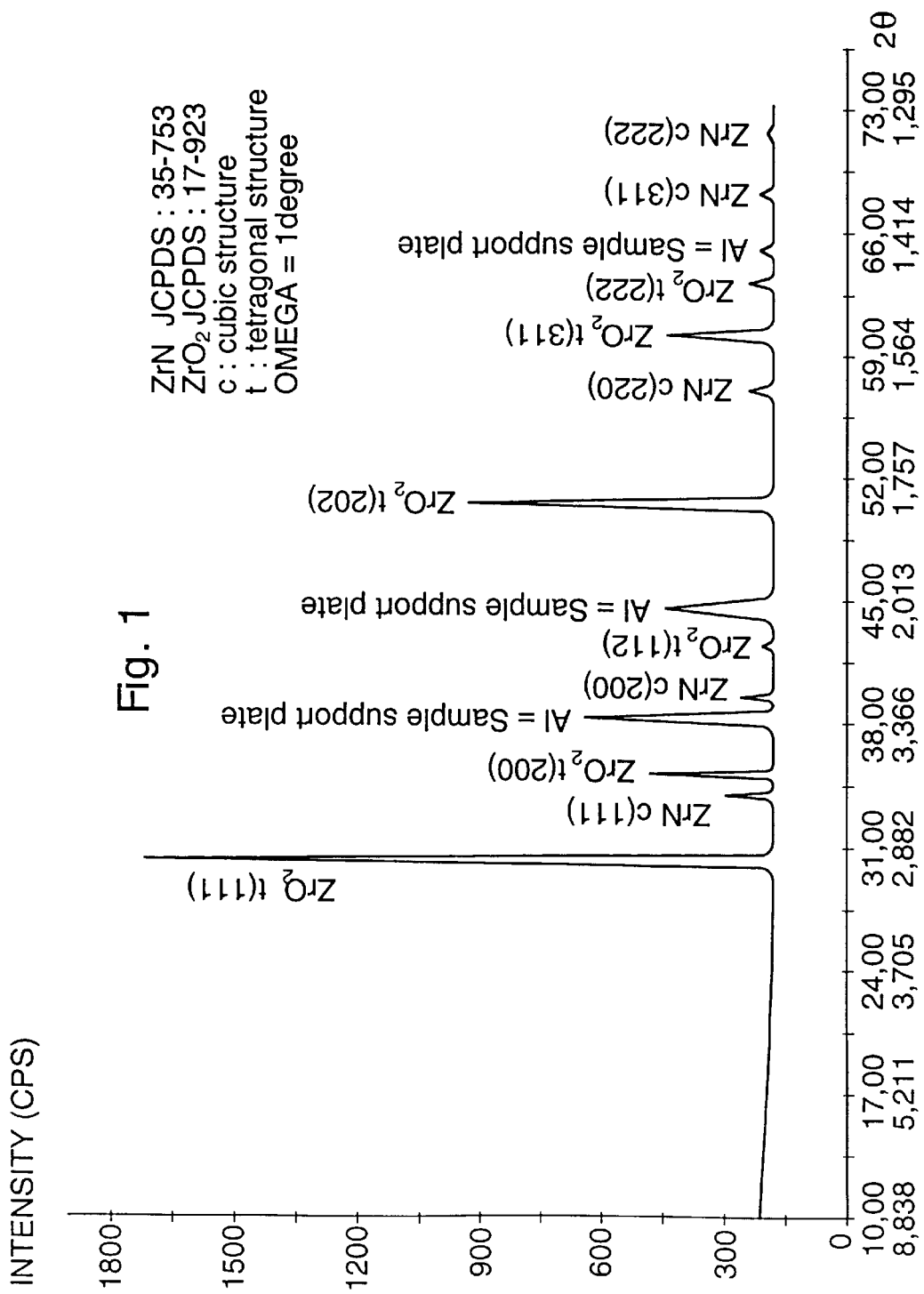
FIGS. 1 and 2 are respectively grazing (surface structure) and standard (core structure) X-ray diffraction spectrum measured on an article according to the invention.

By way of example, an article made of zirconia having a tetragonal crystallographic configuration (zirconium oxide, $ZrO_2$), white in colour and which is made according to conventional manufacturing techniques for ceramic articles, for example by sintering is first provided.

This article may be a finished product having the final shape in which it will be used, for example a part of generally parallelepiped shape already mirror polished and intended to form an exterior part of a wristwatch, for example a wristband link.

Of course, if required, the article may be a semi-finished product on which subsequent machining operations will be performed in order to adapt such article to its final use.

This article is then placed in a reaction vessel in which a plasma is generated from ionization of a gaseous mixture of ammonia and an inert gas, or a mixture of nitrogen, hydrogen and an inert gas, or a combination of these two mixtures. This plasma is generated for example by electric discharge.

According to the method used to generate the plasma, the use of argon as inert gas is advantageous. Of course the use of other inert gases such as neon can be envisaged.

The article is maintained in the plasma during a period of time from 15 to 240 minutes and preferably between 15 and 150 minutes. The average temperature of the article during treatment of the latter varies from 600 to 1,300° C. according to the parameters (time, composition of the gaseous mixture, flow rates, etc.) of the process.

After this latter operation, the article has the gold metallic brilliance or lustre of zirconium nitride while maintaining a very high level of superficial hardness indispensable for obtaining a wear resistant article in normal conditions of use.

An essential point of the method lies in the fact that it concerns transformation of the article over a small thickness, of the order of 100 to 1,000 nm, the zirconia (zirconium oxide) in the external region being converted into zirconium nitride having a gold metallic brilliance. It therefore concerns a superficial conversion of the structure of the zirconia into a new crystallographic structure corresponding to that of zirconium nitride and not an added coating liable to be torn off or become detached from the surface of the article, in particular when the latter is subjected to significant wear conditions.

More particularly, the external region of the superficial layer which has the zirconium nitride structure extends from the surface of the article over a depth of between 20 and 150 nm.

The transition region situated between the core of the article and the external region includes sub-stoichiometric zirconium nitride of the $ZrN_{1-y}$ type. The sub-stoichiometry of the zirconium nitride increases progressively (the nitrogen content decreasing) towards the core of the article while from a certain depth, an increasing quantity of oxygen appears progressively in the form of zirconium oxynitride.

The core of the article is then reached, said core essentially being formed of partially reduced zirconia of the $ZrO_{2-x}$ type and/or zirconia $ZrO_2$.

The method according to the invention thus modifies not only the surface but also the core of the article or a part of such core, which is converted or transformed into $ZrO_{2-x}$, according to the dimensions of the article, such core then having a grey colour.

Figure 2:
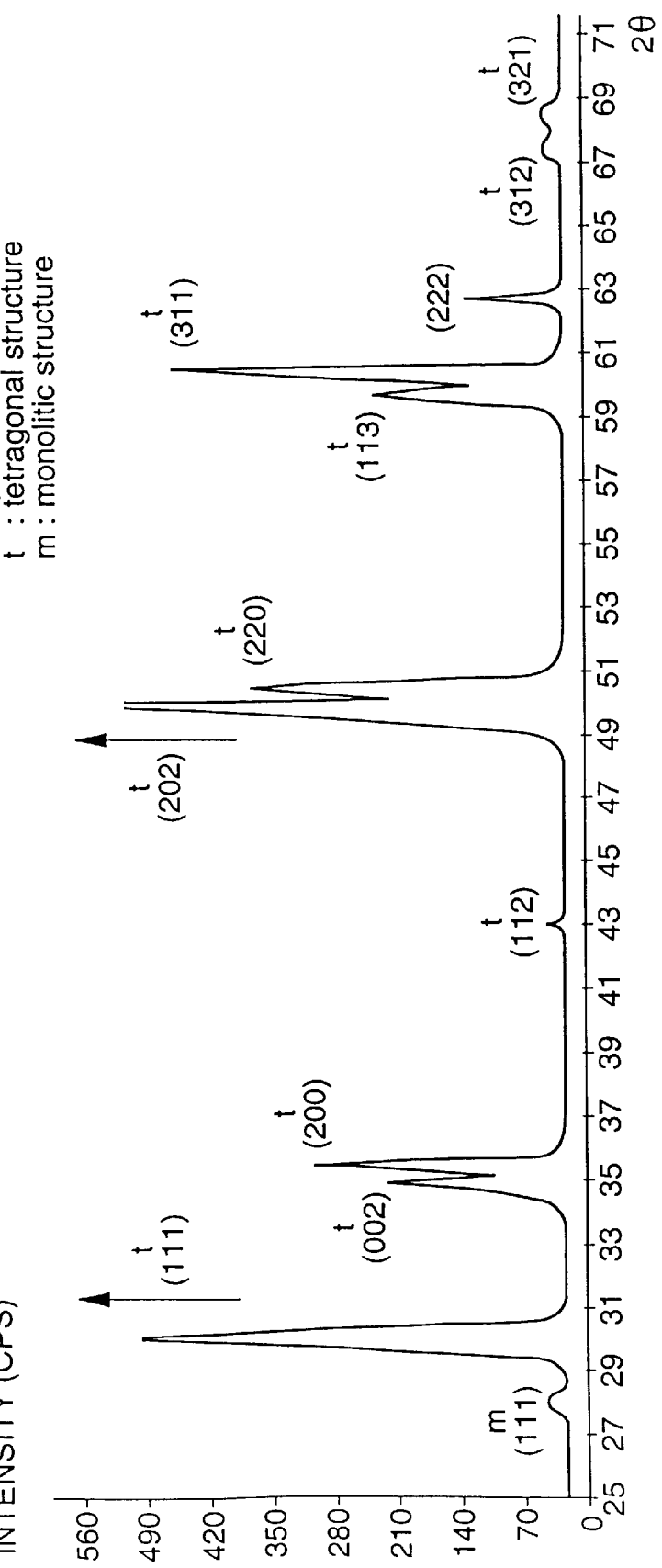

The structure of the superficial layer of the zirconia article transformed at the surface has been shown by the diffraction spectrum obtained with grazing X-rays while the structure of the core has been shown by standard X-ray diffraction techniques. In these spectrum, visible in FIGS. 1 and 2 respectively, the characteristic peaks of zirconium nitride and zirconia are recognizable.

EXAMPLE 1

Several wristband links made of white tetragonal zirconia ($ZrO_2$), having a length of 20 mm, a width of 7 mm and a thickness of 3 mm are placed in a plasma reaction vessel having a diameter of 700 mm. A mixture of gas including 43% argon (Ar), and 57% ammonia (NH3) is injected in said reaction vessel. The argon flow rate is 1250 sccm and the ammonia flow rate is 1650 sccm. Power is fixed at 220 A and 89V. Moreover, the pressure in the reaction vessel is fixed at 1.5 millibars. A plasma is conventionally generated between the cathode and the anode in the reaction vessel. The ionized gas mixture then comes into contact with the surface of the links and the atomic nitrogen of the plasma is substituted for the oxygen of the zirconia. The hydrogen in the reaction vessel acts as a catalyst for this reaction and prevents reoxidation of the zirconia. During treatment of the links, the temperature in the reaction vessel settles at approximately 1100° C. The treatment lasts three hours. The links are then taken out of the reaction vessel and subjected to RBS (Rutherford back-scattering) analyses. These analyses demonstrate that part of the surface of the links has been converted into zirconium nitride (ZrN) over a depth of approximately 100 nm. The hardness of the treated links has also been measured. The Vickers hardness values obtained are of the order of 12 Gpa. The links obtained have a gold metallic appearance very close to that of gold.

EXAMPLE 2

A watch case made of white tetragonal zirconia is placed in a plasma reaction vessel as described in example 1. The case has a generally rectangular shape and has a length of 30 mm, a width of 24 mm and a height of 5 mm. This case is hollowed at the centre thereof. The operating procedure is identical to that described in example 1, the only difference being that the gas mixture used includes 74% nitrogen, 4% hydrogen, and 22% argon. The argon flow rate is 1200 sccm, the nitrogen flow rate is 4000 sccm and the hydrogen flow rate is 200 sccm. Power is fixed at 170 A and 60V. In this example, the temperature in the reaction vessel settles at approximately 1000° C. during treatment. The treatment lasts four hours. The watch cases obtained have a gold metallic appearance similar to the links previously described, and have the same transformation and hardness properties as those described in example 1.

It is clear from the above that the method according to the invention allows articles, in particular decorative articles of gold metallic appearance, combining certain of the properties of ceramics and metals, to be achieved.

It is thus possible to obtain decorative articles of great levels of hardness, having a particularly aesthetic appearance and gold metallic brilliance, easily able to be shaped and not liable to cause allergic reactions with the wearer's skin. Consequently, these articles are perfectly suited to use as decorative articles and in particular as construction parts for bracelets or cases for timepieces.

What is claimed is:

1. A method for obtaining a finished or semi-finished zirconia based ceramic article having a core of $ZrO_2$ and/or partially reduced $ZrO_2$, the article having a gold metallic external appearance, wherein it includes the following steps of:

providing at least one zirconia article previously shaped into its finished or semi-finished shape;

placing said article in a reaction vessel in which a plasma is generated from a gaseous mixture of ammonia and an inert gas, or a mixture of nitrogen, hydrogen and an inert gas, or a combination of such two mixtures; and maintaining said article in the plasma for a period of time of approximately 15 to 240 minutes, the average temperature of the article being settled in these conditions between 600 and 1,300° C.

2. A method according to claim 1, wherein the inert gas is argon.

* * * * *